(12) United States Patent
Spyrou et al.

(10) Patent No.: US 6,306,967 B1
(45) Date of Patent: Oct. 23, 2001

(54) SOLID, OXAZOLINE-TERMINATED, URETHANE-FUNCTIONAL POLYADDITION COMPOUNDS, A PROCESS FOR PREPARING THEM AND THEIR USE

(75) Inventors: Emmanouil Spyrou, Marl; Andreas Wenning, Nottuln, both of (DE)

(73) Assignee: Degussa-Hüls Aktiengesellschaft, Marl (DE)

( * ) Notice: Subject to any disclaimer, the term of this patent is extended or adjusted under 35 U.S.C. 154(b) by 0 days.

(21) Appl. No.: 09/395,249

(22) Filed: Sep. 13, 1999

(30) Foreign Application Priority Data

Sep. 11, 1998 (DE) ................................. 198 41 542

(51) Int. Cl.7 ........................... C08L 75/00; C08G 18/38; C08G 18/66; C07D 413/12
(52) U.S. Cl. ..................... 525/131; 525/329.9; 525/437; 525/440; 525/934; 528/73; 528/76; 528/80; 528/83; 548/238
(58) Field of Search ..................... 525/131, 440, 525/934, 329.9, 437; 528/73, 76, 80, 83; 548/238

(56) References Cited

U.S. PATENT DOCUMENTS

| | | |
|---|---|---|
| 4,245,063 | 1/1981 | Thill et al. . |
| 5,196,544 * | 3/1993 | Hase .................................... 548/238 |
| 5,292,807 | 3/1994 | Schaefer et al. . |

FOREIGN PATENT DOCUMENTS 44 42 908   6/1996   (DE) .

OTHER PUBLICATIONS

Derwent Abstracts, AN 1994–023061, JP 05 331400, Dec. 14, 1993.

Derwent Abstracts, AN 1986–314249, JP 61 231064, Oct. 15, 1986.

* cited by examiner

*Primary Examiner*—Patricia A. Short
(74) *Attorney, Agent, or Firm*—Oblon, Spivak, McClelland, Maier & Neustadt, P.C.

(57) ABSTRACT

A solid, oxazoline-terminated, urethane-functional polyaddition compound having a melting point ranging from 40–130° C. and a free NCO content of less than 3% by weight, consisting essentially of a reaction product of a) at least one at least difunctional polyisocyanate and b) at least one hydroxy- or amino-functional oxazoline derivative, the ratio of NCO to OH equivalents ranging from 0.8:1.2 to 1.2:0.8.

24 Claims, No Drawings

SOLID, OXAZOLINE-TERMINATED, URETHANE-FUNCTIONAL POLYADDITION COMPOUNDS, A PROCESS FOR PREPARING THEM AND THEIR USE

BACKGROUND OF THE INVENTION

1. Field of the Invention

The present invention relates to solid, oxazoline-terminated, urethane-functional polyaddition compounds, to a process for preparing them and to their use for preparing plastics, especially powder coating materials, which crosslink to give high-gloss coating films which are stable to light and weathering.

2. Description of the Background

Externally or internally blocked polyisocyanates, which are solid at room temperature, are valuable crosslinking agents for thermally crosslinkable polyurethane (PU) powder coating materials. For example, DE-A 27 35 497 describes PU powder coating materials having excellent weathering and thermal stability. In another disclosure, which is DE 27 12 931, the crosslinking agents, whose preparation is described therein, consist of ε-caprolactam-blocked, isocyanate-functional isophorone diisocyanate. Also known are urethane-, biuret- and urea-functional polyisocyanates, whose isocyanate groups are likewise blocked.

The disadvantage of these systems lies in the elimination of the blocking agent during the thermal crosslinking reaction. Since the blocking agent can, therefore, be discharged into the environment, it is necessary on ecological and occupational-hygiene grounds to take special precautions to remove cleanse the atmosphere discharged from the process and to recover the blocking agent. In addition, the crosslinking agents normally employed have low reactivity, i.e., curing temperatures of more than 170° C. are required.

DE 30 30 539 and DE 30 30 572 describe processes for preparing urethane-functional polyaddition compounds whose terminal isocyanate groups are capped irreversibly with monoalcohols or monoamines. The chain-terminating constituents of the crosslinking agents are particularly disadvantageous, since they lead to low network densities in the PUR powder coatings and thus to moderate solvent resistances.

Hydroxyl-terminated, uretdione-functional polyaddition compounds are the subject of EP 0 669 353. Their functionality of two accordingly constitutes an enhanced resistance to solvents. A feature common to the powder coating materials, based on these uretdione functional polyisocyanates, is that they emit no volatile compounds in the course of the curing reaction. However, at a minimum of 180° C., the stoving temperatures are high.

Publications JP 51 125 116, JP 49 124 130, JP 51 054 626, DE 25 05 862 and U.S. Pat. No. 4,245,063 describe powder coating materials whose oxazoline-functional acrylate copolymers are cured with polycarboxylic acids. The oxazoline groups are incorporated into the resin by copolymerizing 2-isopropenyl-2-oxazoline with unsaturated monomers.

Powder coating materials based on acid polyesters or acrylates and polyoxazoline curing agents are described, for example, in DE 23 28 012, DE 23 28 013, JP 51-136727, JP 50-037832, JP 56-036551, JP 51-134 727 and JP 51-089534. The polyoxazoline curing agents contain no additional functional groups, and so the flexibility of the powder coatings and their adhesion to the substrate are in need of improvement.

DE 44 42 908 describes the use of oxazoline-terminated polyurethanes. These compounds, however, are liquid and are, therefore, unsuitable for use as powder coating hardeners (curing agents). Moreover, in this case curing is initiated by cationic polymerization, which is known to be highly susceptible to disruption because of the presence of impurities. Moreover, such polymerization conditions rule out the use of basic pigments and auxiliaries.

SUMMARY OF THE INVENTION

Accordingly, one object of the present invention is to provide highly reactive crosslinking agents, which are free from elimination products, for preparing plastics, especially ecologically valuable powder coating materials, with the powder coating materials prepared therefrom no longer showing the above-mentioned disadvantages of powder coating materials of the prior art.

Briefly, this object and other objects of the invention as hereinafter will become more readily apparent can be attained by a solid, oxazoline-terminated, urethane-functional polyaddition compound having a melting point ranging from 40–130° C. and a free NCO content of less than 3% by weight, consisting essentially of a reaction product of a) at least one difunctional polyisocyanate and b) at least one hydroxy- or amino-functional oxazoline derivative, the ratio of NCO to OH equivalents ranging from 0.8:1.2 to 1.2:0.8

In an embodiment of the invention, the ratio of NCO to OH equivalents preferably ranges from 1:1.

In still another embodiment the composition further contains a component c) which is a chain extender.

DETAILED DESCRIPTION OF THE PREFERRED EMBODIMENTS

The invention provides for the use of oxazoline-terminated, urethane-functional polyaddition compounds for the preparation of plastics, especially in combination with carboxyl-containing polymers, and with the additives customary in paint chemistry such as pigments, fillers leveling agents, degassing agents, catalysts and other additives, for the preparation of transparent and pigmented powder coating materials which are free from elimination products and are of high reactivity and excellent gloss.

The invention also provides transparent and pigmented powder coating materials, free from elimination products, which comprise the oxazoline-terminated urethane-functional polyaddition compounds of the invention.

Polyisocyanates which are specified, for example, in Houben-Weyl, Methoden der Organischen Chemie, Volume 14/2, page 61 ff. and J. Liebigs Annalen der Chemie, Volume 562, pages 75–136 are employed in the polyaddition compounds of the invention. The polyisocyanate can be any organic polyisocyanate suitable for crosslinking compounds containing active hydrogen; in other words, (cyclo)aliphatic, aromatic and heterocyclic polyisocyanates having at least two isocyanate groups, and mixtures thereof Representative examples of the polyisocyanates include aliphatic isocyanates such as akylene isocyanates, embodiments of which are ethylene diisocyanate, propylene diisocyanate, tetramethylene diisocyanate, pentamethylene diisocyanate, 2-methylpentamethylene 1,5-diisocyanate, hexamethylene diisocyanate, trimethylhexamethylene 1,6-diisocyanate, especially the 2,2,4 and the 2,4,4 isomers and technical-grade mixtures of both isomers, decamethylene diisocyanate and dodecamethylene diisocyanate, and also cycloalkylene isocyanates, embodiments of which are 1,3-cyclopentyldiisocyanate, 1,2-cyclohexyldiisocyanate, 1,4-cyclohexyldiisocyanate,ω,ω'-diisocyanato-1,4-methylcyclohexane, ω,ω'-diisocyanato-1,3-dimethylcyclohexane, 1-methyl-2,4-diisocyanatocyclohexane, 4,4'-methylene-bis(cyclohexyl isocyanate) and 3,3,5-trimethyl-1-isocyanato-3-isocyanatomethylcyclohexane. Representative examples of polyisocyanates include aromatic isocyanates such as aryl isocyanates, embodiments of which are m-phenylene diisocyanate, p-phenylene diisocyanate, 4,4'-biphenyl diisocyanate, 1,4-naphthalene diisocyanate and 1,5-naphthalene diisocyanate, and also alkaryl isocyanates, an example being diisocyanatodiphenylmethane, especially the 4,4' isomer, and also technical-grade mixtures of various isomers, for example, the 4,4' and 2,4' isomers, diisocyanatomethylbenzene, especially the 2,4 and the 2,6 isomers, and technical-grade mixtures of both isomers, 4,4'-toluidine diisocyanate, 1,3-bis(isocyanatomethyl) benzene and polymethylenepolyphenyl isocyanate, and ring-substituted aromatic isocyanates, embodiments of which are dianisidine diisocyanate, 4,4'-diphenyl ether diisocyanate and chlorodiphenyl diisocyanate. Also highly suitable are polyisocyanates which may be prepared by reacting polyisocyanates with themselves by way of the isocyanate groups, such as isocyanurates formed by reaction of three isocyanate groups. The polyisocyanates may likewise include biuret groups or allophanate groups.

As the oxazoline component it is possible to use all hydroxy- or amino alkyl-Δ²-oxazolines of the following composition:

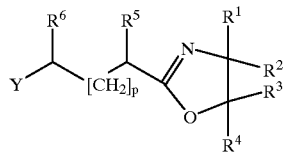

wherein $R^1$–$R^6$ can be hydrogen atoms or alkyl groups having 1–4 carbon atoms. Y is either an alcohol or an amino function and p is a number from 0–3.

Particularly preferred oxazolines of the above type are those in which $R^1$ and $R^2$, simultaneously or independently of one another, are either hydrogen or methyl groups, $R^3$–$R^6$ are hydrogen atoms, and p has the value 0 or 3.

The hydroxy- or amino-functional oxazolines can be prepared by known processes [DE 39 14 133, DE 39 14 159, DE 14 45 642 or Litt and Levy, J. Polym. Sci. Al, 1883 (1968)].

Polyols, polyamides or amino alcohols are used as chain extenders.

Suitable polyols, for example, are described in the DE 19 57 483, DE 21 05 777, DE 25 42 191 and DE 27 38 270. Suitable examples include the diols ethylene glycol, 1,2-propanediol and 1,3-propanediol, 2,2-dimethyl-1,3-propanediol, 1,4-butanediol, 1,6-hexanediol, 2-methyl-1,5-pentanediol, 2,2,4-trimethyl-1,6-hexanediol, 2,4,4-trimethyl-1,6-hexanediol, 1,7-heptanediol, 1,12-dodecanediol, 9,10-octadecadiene-1,12-diol, thioglycerol 1,18-octadecanediol, 2,4-dimethyl-2-propyl-1,3-heptanediol, 1,4-butenediol, 1,4-butynediol, diethylene glycol, triethylene glycol, tetraethylene glycol, trans- and cis-1,4-cyclohexanedimethanol; the triols glycerol, 1,2,6-hexanetriol, 1,1,1-trimethylolpropane and 1,1,1-trimethylolethane, and the tetraol pentaerythritol. Polyols in the context of the invention also include branched and, preferably, linear hydroxyl-containing polyesters having a molecular weight ranging from 250 and 2000. They can be prepared, for example, by condensing diols with dicarboxylic acid. The preparation is described, for example, in EP 0 669 353.

Polyols within the scope of the invention also include hydroxyl-containing polyesters, polythioethers, polyethers, polycaprolactams, polyepoxides, polyesteramides and polyurethanes.

Carboxylic acids preferred for the preparation of polyesters can be aliphatic, cycloaliphatic, aromatic and/or heterocyclic in nature and can, if desired, be unsaturated and/or substituted by halogen atoms. Suitable examples include succinic, adipic, suberic, azelaic, sebacic, phthalic, terephthalic, isophthalic, trimellitic, pyromellitic, tetrahydrophthalic, hexahydrophthalic, hexahydroterephthalic, di- and tetrachlorophthalic, endomethylenetetrahydrophthalic, glutaric, maleic and fumaric acids and, insofar as it is possible to obtain them, their anhydrides; dimethyl terephthalate, bisglycol terephthalate, and also cyclic monocarboxylic acids such as benzoic acid, p-tert-butylbenzoic acid and hexahydrobenzoic acid.

Suitable examples of polyhydric alcohols include ethylene glycol, 1,2- and 1,3-propylene glycol, 1,4- and 2,3-butylene glycol, di-β-hydroxyethylbutanediol, 1,6-hexanediol, 1,8-octanediol, neopentyl glycol, cyclohexanediol, 2,2-bis(hydroxymethyl)propane, 2-methyl-1,3-propanediol, 2-methyl-1,5-pentanediol, 2,2,4-(2,4,4)-trimethyl- 1,6-hexanediol glycerol, trimethylolpropane, trimethylolethane, 1,2,6-hexanetriol, 1,2,4-butanetriol, tris(β-hydroxyethyl) isocyanurate, pentaerythritol, mannitol and sorbitol, and also diethylene glycol, triethylene glycol, tetraethylene glycol, dipropylene glycol, polypropylene glycol, polybutylene glycol, xylylene glycol, and neopentyl glycol hydroxypivalate.

It is also possible to employ monoesters and polyesters as lactones, e.g., ε-caprolactone, or hydroxycarboxylic acids, e.g., hydroxypivalic acid, ε-hydroxydecanoic acid, ε-hydroxycaproic acid, and thioglycolic acid; polyesters formed from the above-mentioned polycarboxylic acids or their derivatives and polyphenols such as hydroquinone, bisphenol A, 4,4'-dihydroxybiphenyl or bis(4-hydroxyphenyl) sulfone; polyesters of carbonic acid which are prepared from hydroquinone, diphenylolpropane, p-xylylene glycol, ethylene glycol, butanediol or 1,6-hexanediol and other polyols by means of customary condensation reactions, for example, with phosgene or with diethyl carbonate or diphenyl carbonate, or from cyclic carbonates such as glycol carbonate or vinylidene carbonate, by polymerization in a known manner; polyesters of silicic acid, polyesters of phosphoric acid, for example, from methane-, ethane-, p-chloroethane-, benzene- or styrene-phosphoric acid, -phosphoric chloride or -phosphoric esters and polyalcohols or polyphenols of the above type; polyesters of boric acid; polysiloxanes, such as products obtainable, for example, by hydrolysis of dialkyldichlorosilanes with water and subsequent treatment with polyalcohols or by addition reaction of polysiloxane dihydrides with olefins, such as allyl alcohol or acrylic acid, can also be employed.

Examples of other preferred polyesters are the reaction products of polycarboxylic acids and glycidyl compounds, as described, for example, in DE 24 10 513.

Examples of glycidyl compounds which can be used include esters of 2,3-epoxy-1-propanol with monobasic acids having 4–18 carbon atoms such as glycidyl palmitate, glycidyl laurate and glycidyl stearate, alkylene oxides having 4–18 carbon atoms such as butylene oxide, and glycidyl ethers such as octyl glycidyl ether.

Dicarboxylic acids which can be used in this process include all polycarboxylic acids listed below in Section II; it likewise being possible to employ monocarboxylic acids which are listed, for example, in Section III.

Other preferred components include monomeric esters, examples being dicarboxylic acid bishydroxy(alcohol) esters, monocarboxylic esters of more than dihydric polyols, and oligoesters which can be prepared by condensation reactions from the raw materials customary in paint chemistry. Examples of compounds which can be regarded as such are:

I. Alcohols having 2–24, preferably 2–10, carbon atoms and 2–6 OH groups attached to nonaromatic carbon atoms, examples being ethylene glycol, propylene glycol, diethylene glycol, dipropylene glycol, butanediols, neopentyl glycol, hexanediols, hexanetriols, perhydrobisphenol, dimethylolcyclohexane, glycerol, trimethylolethane, trimethylolpropane, pentaerythritol, dipentaerytlritol and mannitol;

II. Di- and polycarboxylic acids having 4–36 carbon atoms and 2–4 carboxyl groups, and their esterifiable derivatives such as anhydrides and esters, examples being phthalic acid (anhydride), isophthalic acid, terephthalic acid, alkyltetrahydrophthalic acid, endomethylenetetrahydrophthalic anhydride, adipic acid, succinic acid, maleic acid, fumaric acid, dimeric fatty acids trimellitic acid, pyromellitic acid and azelaic acid;

III. Monocarboxylic acids having 6–24 carbon atoms, examples being caprylic acid, 2-ethylhexanoic acid, benzoic acid, p-tert-butylbenzoic acid, hexahydrobenzoic acid, monocarboxylic acid mixtures of natural oils and fats, such as coconut fatty acid, soy-oil fatty acid, ricinene fatty acid, hydrogenated and isomerized fatty acids, such as "Konjuvandol" fatty acid, and mixtures thereof, it also being possible to employ the fatty acids as glyceride and to react them by transesterification and/or dehydration; and IV. Monohydric alcohols having 1–18 carbon atoms, examples being methanol, ethanol, isopropanol, cyclohexanol, benzyl alcohol, isodecanol, nonanol, octanol and oleyl alcohol.

The polyesters can be obtained in a manner known per se by condensation in an inert gas atmosphere at temperatures from 100–260° C., preferably from 130–220° C., in the melt or in an azeotropic procedure, as is described, for example, in Methoden der Organischen Chemie (Houben-Weyl); Volume 14/2, pages 1–5, 21–23, 40–44, Georg Thieme Verlag, Stuttgart, 1963, or in C. R. Martens, Alkyd Resins, pages 51–59, Reinhold Plastics Appl. Series, Reinhold Publishing Comp., NewYork, 1961.

Other suitable polyols include hydroxy-functional polyethers and polycarbonates. Preferred polyethers can be prepared, for example, by polyaddition of epoxides such as ethylene oxide, propylene oxide, butylene oxide, trimethylene oxide, 3,3-bis(chloromethyl)oxabicyclobutane, tetrahydrofuran, styrene oxide or the 2,5-bisepoxypropyl ether of diphenylolpropane, by cationic polymerization in the presence of Lewis acids such as boron trifluoride, or by anionic polymerization with alkali metal hydroxides or alkali metal alcoholates, or by addition reaction of these epoxides, alone or in a mixture or in succession, with starting components containing reactive hydrogen atoms such as alcohols or amines, examples being water, ethylene glycol, poly-1,3-propylene glycol, poly-1,2-propylene glycol, pentamethylene glycol, hexanediol, decamethylene glycol, trimethylolpropane, aniline, ammonia ethanolamine, ethylenediamine, di(βhydroxypropyl)methylamine, and hydroxyalkylated phenols such as di(β-hydroxyethoxy) resorcinol, for example.

Polyols may also be used which contain carbonate groups polyols can be obtained, as is known, by reacting the exemplified dihydric alcohols of the molecular weight range of 62–300 with diaryl carbonates such as diphenyl carbonate, phosgene or, preferably, cyclic carbonates such as trimethylene carbonate or 2,2-dimethyltrimethylene carbonate (NPC), or mixtures of such cyclic carbonates. Particularly preferred carbonate diols are those which can be prepared from said dihydric alcohols as starter molecules and NPC, with ring opening.

The reactant compounds which have groups that are reactive toward isocyanates also include, for example, the polythioethers, polyacetals, polyepoxides, polyesteramides and polyurethanes of the molecular weight range of 250–8,500, which are known per se in polyurethane chemistry and have isocyanate-reactive hydroxyl groups.

It is of course also possible to use mixtures of the above-mentioned polyols.

The polyamines which are suitable for chain extension include, for example, 1,2-ethylenediamine, 1,2-propylenediamine, 1,3-propylenediamine, 1,2-butylenediamine, 1,3-butylenediamine, 1,4-butylenediamine, 2-(ethylamino)ethylamine, 3-(methylamino)propylamine, 3-(cyclohexylamino) propylamine, 4,4'-diaminodicyclohexylmethane, isophoronediarmine, 4,7-dioxadecane- 1,10-diamine, N-(2-aminoethyl)-1,2-ethanediamine, N-(3-aminopropyl)-1,3-propanediamine, N,N'-1,2-ethanediylbis(1,3-propanediamine) and also hexamethylenediamine, which may also carry one or more $C_1$–$C_4$-alkyl radicals. It is also possible, furthermore, to employ disecondary or primary/secondary diamines, as are obtained, for example, in a known manner from the corresponding diprimary diamines by reaction with a carbonyl compound such as a ketone or aldehyde, and subsequent hydrogenation or by addition reaction of diprimary diamines with acrylic esters. Mixtures of said polyamines can also be used.

Aminoalcohol chain extenders which may be used include monoethanolamine, 3-amino-1-propanol, isopropanolamine, aminoethoxyethanol, N-(2-aminoethyl) ethanolamine, N-ethylethanolamine, N-butylethanolamine, diethanol-amine, 3-(hydroxyethylamine)-1-propanol and diisopropanolamine.

Mixtures of the chain extenders listed are of course able to be employed.

This invention also provides a process of preparing the polyaddition compounds of the invention.

The reaction between polyisocyanate, chain extender and oxazoline derivative to give the polyaddition compound of the invention can be conducted as follows. The temperature of preparation generally ranges from room temperature to 120° C., the reaction time ranging from 30 minutes to 5 hours. Depending on the reactivity of the individual components it is possible to choose reaction times and temperatures which fall markedly above or below these ranges. Normally, the polyisocyanate is introduced as initial charge into the reactor in the absence of moisture. The initial charge, if desired, is diluted with an anhydrous solvent containing no active hydrogen, and then first the chain extender and then the oxazoline derivative (or vice versa) are added in portions. To accelerate the reaction of isocyanates with alcohols it is possible to add the customary catalysts, especially tin and zinc compounds, examples being dibutyltin dilaurate and zinc octoate, or else tertiary amines such as 1,4-diazabicyclo[2.2.2] octane, for example, to the reactor. The reaction between amines and isocyanates can be accelerated with acid catalysts such as 2-ethyihexanoic acid, for example.

The reaction of the individual components can be monitored simply by means of the still unreacted isocyanate, for example, by reaction of the isocyanate with dibutylamine and back-titration with hydrochloric acid. The end point of the reaction is reached when it is no longer possible to detect free isocyanate by this means. The reaction mixture is cooled and the solvent, if present, is removed. The resulting solid has a melting point ranging from 40–130° C.

The present invention also provides for the use of the oxazoline-terminated, urethane-functional polyaddition compounds for the preparation of plastics, especially in combination with carboxyl-terminated polymers and with the additives customary in paint chemistry, for the preparation of transparent and pigmented powder coating materials which are free from elimination products and feature very good reactivity and are, therefore, valuable both economically and ecologically.

The present invention also provides transparent and pigmented powder coating materials, free from elimination products, consisting of the polyaddition compound of the invention in combination with carboxyl-containing polymers. The polymers employed can be addition polymers, polycondensates and polyaddition compounds. It is possible in principle to use any polymer which comprises at least two carboxyl groups and melts at at least 70° C.

Within the context of the invention, particular preference is given to polycarboxyl polyesters and polycarboxyl polyacrylates.

The carboxyl-containing polymers are preferably polyester polycarboxylic acids which are prepared from polyols and polycarboxylic acids and/or their derivatives. The melting range of these acidic polyesters ranges from 60–160° C., preferably from 80–120° C.; their acid number varies from 10–150 mg of KOH/g, preferably from 30–60 mg of KOH/g. The OH numbers should be below 10 mg of KOH/g.

For the preparation of the polyesterpoycarboxylic aicids to be used in accordance with the invention, use is made of polycarboxylic acids, such as oxalic, adipic, 2,2,4(2,4,4)-trimethyladipic, azelaic, sebacic, decanedicarboxylic, dodecanedicarboxylic, fumaric, phthalic, isophthalic, terephthalic, trimellitic and pyromellitic acid. Examples of polyols used for the acidic polyesters are as follows: ethylene glycol, 1,2- and 1,3-propanediol, 1,2-, 1,3-, 1,4- and 2,3-butanediol, 1,5-pentanediol, 3-methyl-1,5-pentanediol, neopentyl glycol, 1,12-dodecanediol, 2,2,4(2,4,4)trimethyl-1,6-hexanediol, trimethylolpropane, glycerol, pentaerythritol, 1,4-bishydroxy methylcyclohexane, 1,4-cyclohexanediol, diethylene glycol, triethylene glycol and dipropylene glycol. It is, of course, possible to react hydroxyl-containing polyesters prepared by known processes from polycarboxylic acids and polyols with polycarboxylic acids and/or polycarboxylic anhydrides to give the polyester polycarboxylic acids.

Suitable carboxyl-functional acrylate polymers possess an acid number ranging from 10–150 mg of KOH/g and are prepared by copolymerizing a monomer mixture consisting of:
a) from 0–70 parts by weight of methyl (meth)acrylate,
b) from 0–60 parts by weight of (cyclo)alkyl esters of acrylic and/or methacrylic acid having 2–18 carbon atoms in the alkyl or cycloalkyl radical,
c) from 0–90 parts by weight of vinylaromatic compounds, and
d) from 0–60 parts by weight of ethylenically unsaturated carboxylic acids, the sum of the parts by weight of components (a) to (d) being 100.

The monomers b) are preferably (cyclo)alcyl esters of acrylic or methacrylic acid having 2–18 carbon atoms in the (cyclo)alkyl radical. Examples of suitable and, respectively, preferably suitable monomers b) include ethyl (meth) acrylate, n-propyl (meth)acrylate, isopropyl (meth)acrylate, n-butyl (meth)acrylate, isobutyl (meth)acrylate tert-butyl (meth)acrylate, 2-ethylhexyl(meth)acrylate, cyclohexyl methacrylate, neopentyl methacrylate, isobomyl methacrylate, 3,3,5-trimethylcyclohexyl methacrylate and stearyl methacrylate.

Examples of suitable monomers c) include styrene, vinyltoluene and ethylstyrene. Examples of ethylenically unsaturated carboxylic acids d) include acrylic and methacrylic acid, which are preferably employed, and also crotonic acid, itaconic acid, fumaric acid, maleic acid and citraconic acid.

The preparation of the copolymers can be conducted by copolymerization of the exemplified monomers (a) to (d) by the customary free-radical polymerization techniques such as solution, emulsion, bead or bulk polymerization.

In this case the monomers are copolymerized at temperatures from 60–160° C., preferably from 80–150° C., in the presence of free-radical initiators and, if desired, in the presence of molecular weight regulators.

The carboxyl-functional acrylate copolymers are prepared in inert solvents. Examples of suitable solvents include aromatic compounds such as benzene, toluene and xylene; esters, such as ethyl acetate, butyl acetate, hexyl acetate, heptyl acetate, methyl glycol acetate, ethyl glycol acetate and methoxypropyl acetate; ethers such as tetrahydrofuran, dioxane and diethylene glycol dimethyl ether; ketones such as acetone, methyl ethyl ketone, methyl isobutyl ketone, methyl n-amyl ketone and methyl isoamyl ketone, or any desired mixture of such solvents.

The preparation of the copolymers can be carried out continuously or batchwise. Normally, the monomer mixture and the initiator are metered continuously and at a uniform rate into a polymerization reactor and at the same time the corresponding amount of polymer is removed continuously. Preferably, it is possible to prepare copolymers which are virtually identical chemically. Chemically virtually identical copolymers can also be prepared by running the reaction mixture at a constant rate into a stirred vessel without removing the polymer.

It is also possible to introduce a portion of the monomers, for example, in solvents of the above type, as an initial charge, and to introduce the remaining monomers and auxiliaries, separately or together, into this initial charge at the reaction temperature. Polymerization is generally conducted under atmospheric pressure but can also be conducted at pressures of up to 25 bar. The initiators are employed in amounts ranging from 0.05–15% by weight based on the overall amount of the monomers.

Suitable initiators include the usual free-radical initiators, examples being aliphatic azo compounds such as azodiisobutyronitrile, azobis-2-methylvaleronitrile, 1,1'-azobis-1-cyclohexanenitrile and 2,2'-azobisisobutyric acid alkyl esters; symmetrical diacyl peroxides such as acetyl, propionyl or butyryl peroxide, bromo-, nitro-, methyl- or methoxy-substituted benzoyl peroxides, lauryl peroxides; symmetrical peroxodicarbonates, an example being tert-butyl perbenzoate; hydroperoxides such as tert-butyl hydroperoxide, cumene hydroperoxide; dialkyl peroxides such as dicumyl peroxide, tert-butylcumyl peroxide or di-tert-butyl peroxide. In order to regulate the molecular weight of the copolymers it is possible to employ the usual regulators in the course of the preparation. Examples that may be mentioned include mercaptopropionic acid, tert-dodecyl mercaptan, n-dodecyl mercaptan and diisopropylxanthogen disulfide. The regulators can be added in anounts ranging from 0.1–10% by weight, based on the overall amount of the monomers.

The copolymer solutions obtained in the copolymerization can then be supplied without further processing to the devolatilizing or degassing process, in which the solvent is removed, for example, in a devolatizing extruder or spray drier at a temperature ranging from about 120–160° C. under a vacuum ranging from 100–300 mbar, the copolymer of the invention thereby being obtained.

The mixing ratio of the carboxyl-containing polymers to the polyaddition compound of the invention is generally selected so that the ratio of carboxyl groups to oxazoline groups ranges from 1:10 to 10:1.

For the preparation of powder coating materials, the polyaddition compound of the invention is mixed and homogenized in the melt with the appropriate carboxyl-containing polymer and, if desired, with catalysts and also pigments and customary auxiliaries such as fillers, water scavengers such as molecular sieves, anhydrous aluminum sulfate, trialkyl orthoformates, benzoyl chloride, carbodiimides, p-toluenesulfonyl isocyanate and oxazolidines, and leveling agents, an example being silicone oil, or acrylic resins.

Examples of suitable catalysts include phosphorus-, tin- or titanium-based catalysts such as triethyl phosphite, triphenyl phosphite, tetrabutyl titanate, dibutyltin dilaurate, zinc octoate, zinc acetate, zinc stearate, and the like. The catalyst is employed in a concentration ranging from 0.01–5% by weight based on the amount of carboxyl-terminated polymer.

Homogenization can be conducted in a suitable apparatus such as treatable kneading equipment, but preferably by extrusion, in which case the upper temperature limits of from 120–130° C. should not be exceeded. After cooling to room temperature and appropriate comminution, the extruded mass is ground into a ready-to-spray powder. The application of the ready-to-spray powder to appropriate substrates can be performed by known techniques, such as, for example, by electrostatic powder spraying or fluidized-bed sintering, with or without electrostatic assitance. Following powder application the coated workpieces are cured by heating for 60–4 minutes at a temperature from 120–220° C., preferably for 30–6 minutes at a temperature of 120–160° C.

Having now generally described the invention, a further understanding can be obtained by reference to certain specific examples which are provided herein for purpose of illustration only and are not intended to be limiting unless otherwise specified.

EXAMPLES

1. Preparation of the polyaddition compounds of the invention

VESTANAT T 1890/100: isocyanurate of isophorone diisocyanate, NCO number: 17.3% (CREANOVA Spezialchemie GmbH)

TERATHANE 650: polytetrahydrofuran, molecular weight 656 g/mol (DuPont)

DESMODUR N 3300: isocyanurate of hexamethylene diisocyanate, NCO number: 21.3% (Bayer AG)

a) 368 g of VESTANAT T 1890/100 were dissolved in 327 g of anhydrous ethyl acetate, 0.3 g of dibutyltin dilaurate was added, the mixture was heated to 60° C. and 239 g of 2-(5-hydroxypentyl)-2-oxazoline were added in portions. After 3 hours at 60° C., an NCO number of less than 0.1% was determined and the solvent was removed in vacuo. The dried solid has a melting point of 70–74° C. and a $T_g$ of 42° C.

b) 752 g of VESTANAT T 1890/100 were dissolved in 576 g of anhydrous ethyl acetate, and 0.5 g of dibutyltin dilaurate and 233 g of TERATHANE 650 were added. After 3 hours at 60° C., 317 g of 2-(5-hydroxypentyl)-2-oxazoline were added dropwise and the mixture was heated at 60° C. for 2 hours more. Thereafter, the NCO number was less than 0.1%, the solution was cooled and the solvent was removed in vacuo. The dried solid has a melting point of from 84–87° C. and a $T_g$ of 48° C.

c) 618 g of VESTANAT T 1890/100 were dissolved in 627 g of anhydrous ethyl acetate, and 99 g of DESMODUR N 3300 were added. Following the addition of 0.6 g of dibutyltin dilaurate, 472 g of 2-(5-hydroxypentyl)-2-oxazoline were added to the reactor in portions and the mixture was heated to 60° C. and held at this temperature for 3 hours. It was no longer possible thereafter to detect free isocyanate. The powder, freed from the solvent, had a melting point of 62° C. and a $T_g$ of 42° C.

2. Polycarboxyl Polyesters

URALAC P 3700, having an acid number from 34–40 mg of KOH/g and a glass transition point: 57° C. (DSM).

URALAC P 5000, having an acid number from 32–38 mg of KOH/g and a glass transition point: 58° C. (DSM).

3. Powder coating materials

General Preparation Procedure:

The committed starting materials of a polyaddition compound of the invention, leveling agent and catalyst are intimately mixed in an edge runner mill and then homogenized in an extruder at a temperature of up to 130° C. After cooling, the extrudate is fractionated and ground to a particle size <100 $\mu$m using a pinned-disk mill. The resulting powder is applied with an electrostatic powder spraying unit at 60 kV to degreased and optionally pretreated iron panels, which are baked in a circulating-air drying cabinet at temperatures ranging from 120–160° C.

TABLE 1

| Example Formulation* | I | II | III | IV |
|---|---|---|---|---|
| Crosslinker of Example 1 | 26.3 a | 33.3 b | 23.2 c | 15.8 a |
| URALAC P 5000 | | 65.2 | | |
| URALAC P 3700 | 72.2 | | 75.3 | 43.3 |
| COOH/oxazoline | 1:1.3 | 1:1.2 | 1:1.1 | 1:1.3 |
| Titanium dioxide | | | | 40.0 |
| Notes: Addition of 1% Resiflow, 0.5% benzoin | | | | |
| Coating data | | | | |
| LT ($\mu$m) | 70–83 | 75–85 | 64–101 | 65–95 |
| GG 60°<) | n.d. | n.d. | n.d. | 91 |
| CH | 0 | 0 | 0 | 0 |
| EI (mm) | 9 | 8 | >10 | 8 |
| Curing [T (° C.)/t (min)] | 130/30 | 140/20 | 160/10 | 160/20 |

LT: layer thickness
GG 60°<): degree of gloss at 60° C. angle by method of Gardner (ASTM-D 523)
CH: crosshatch
EI: Erichsen indentation in accordance with DIN 53 156
n.d.: not determined
*Amounts of starting materials in percent by weight The disclosure of German priority Application Number 19841542.7 filed Sep. 11, 1998 is hereby incorporated by reference into the present application.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A solid, oxazoline-terminated, urethane-functional polyaddition compound having a melting point ranging from 40–130° C. and a free NCO content of less than 3% by weight, consisting essentially of:

a reaction product of a) at least one at least difunctional polyisocyanate self reacted such that it contains isocyanurate groups and b) at least one hydroxy- or amino-functional oxazoline derivative of the formula:

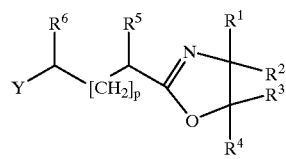

wherein $R^1$–$R^6$ are hydrogen atoms or alkyl groups having 1–4 carbon atoms, Y is hydroxy or amino and p is a number from 0–3 and wherein the ratio of NCO to OH or $NH_2$ equivalents ranges from 0.8:1.2 to 1.2:0.8.

2. The polyaddition compound as claimed in claim 1, whose ratio of NCO to OH or $NH_2$ equivalents is 1:1.

3. The polyaddition compound as claimed in claim 1, wherein at least one chain extender is present as component c).

4. The polyaddition compound as claimed in claim 1, wherein said polyisocyanate is an aliphatic, cycloaliphatic, (cyclo)aliphatic, aromatic or heterocyclic polyisocyanate.

5. The polyaddition compound as claimed in claim 1, wherein said polyisocyanate is isophorone diisocyanate, hexamethylene diisocyanate, 3-methylpentamethylene 1,5-diisocyanate, trimethylhexamethylene 1,6-diisocyanate, 4,4'-methylenebis(cyclohexyl isocyanate), diisocyanatodiphenylmethane, diisocyanatomethylbenzene, 1,3-bis-(isocyanatomethyl)benzene or m-tetramethylxylylene diisocyanate.

6. The polyaddition compound as claimed in claim 1, wherein said polyisocyanate further comprises biuret, allophanate, urethane or urea structures.

7. The polyaddition compound as claimed in claim 1, wherein the polyaddition compound contains a polyol, polyamine and/or amino alcohol chain extender.

8. The polyaddition compound as claimed in claim 7, wherein said polyol employed is a hydroxyl-containing polyester, polythioether, polyether, polycaprolactam, polyepoxide, polyesteramide or polyurethane.

9. The polyaddition compound as claimed in claim 1, wherein said oxazoline compound has the formula:

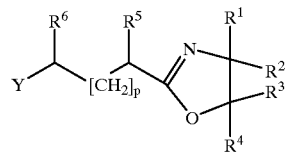

wherein $R^1$ and $R^2$, simultaneously or independently of one another, are hydrogen or methyl, $R^3$–$R^6$ are hydrogen atoms, Y is as defined and p has the value 0 or 3.

10. A process for the preparation of a solid, oxazoline-terminated, urethane-functional polyaddition compound as claimed in claim 1, which comprises:

reacting at least one at least difunctional polyisocyanate self reacted such that it contains isocyanurate groups with at least one hydroxy- or amino- functionalized oxazoline derivative at a temperature from 20–120° C., the ratio of NCO to OH or $NH_2$ equivalents ranging from 0.8:1.2 to 1.2:0.8.

11. The process as claimed in claim 10, wherein the reaction components further comprise a chain extender.

12. The process as claimed in claim 11, wherein the reaction medium contains from 0.01–5% by weight of a catalyst in order to accelerate the reaction of the polyisocyanate with the hydroxy- or amino-functional oxazoline and the chain extender.

13. The process as claimed in claim 10, wherein the reaction is conducted in a solvent.

14. A method of preparing a plastic formulation, comprising:

incorporating the polyaddition compound as claimed in claim 1 in a plastic composition.

15. A method of preparing a powder coating material, comprising:

preparing a transparent or pigmented powder coating material containing the polyaddition compound as claimed in claim 1, which material does not give rise to elimination products upon application.

16. A transparent or pigmented powder coating material, comprising:

a polyaddition compound as claimed in claim 1 in combination with a carboxyl-containing polymer, thereby preparing a coating material which, upon application, results in a product which is free from elimination products.

17. The powder coating material as claimed in claim 16, wherein said carboxyl-containing polymer is a polycarboxyl polyester or polycarboxyl polyacrylate.

18. The powder coating material as claimed in claim 17, wherein said polycarboxyl polyester is a polyester having an acid number of from 10–150 mg of KOH/g.

19. The powder coating material as claimed in claim 17, wherein said polycarboxyl polyacrylate is a polyacrylate having an acid number of from 10–150 ma of KOH/g.

20. A powder coating material as claimed in claim 16, which comprises polyaddition compounds in combination with carboxyl-containing polymers, additives and auxiliaries.

21. A powder coating material as claimed in claim 16, which comprises polyaddition compounds in combination with a carboxyl-containing polymer and a catalyst in an amount of from 0.01–5% by weight.

22. A powder coating material as claimed in claim 21, wherein said catalyst is dibutyltin dilaurate, titanium tetrabutylate, zinc stearate, zinc acetate, zinc octoate, triethyl phosphite or triphenyl phosphite.

23. The powder coating material as claimed in claim 16, wherein the powder coating material further comprises water scavengers, molecular sieves, anhydrous aluminum sulfate, trimethyl orthoformate and/or p-toluenesulfonyl isocyanate.

24. The powder coating material as claimed in claim 16, which has a COOH/oxazoline ratio ranging from 1:10 to 10:1.

* * * * *